United States Patent
Doemling et al.

(10) Patent No.: US 11,436,919 B2
(45) Date of Patent: Sep. 6, 2022

(54) METHOD AND APPARATUS FOR DETERMINING DRIVING STRATEGY OF A VEHICLE

(71) Applicant: Bayerische Motoren Werke Aktiengesellschaft, Munich (DE)

(72) Inventors: Maximilian Doemling, Shanghai (CN); Wanli Jiang, Shanghai (CN); Qianshan Li, Shanghai (CN); Bill Lv, Shanghai (CN); Gavin Xu, Shanghai (CN); Tomas Xu, Shanghai (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 169 days.

(21) Appl. No.: 16/855,544

(22) Filed: Apr. 22, 2020

(65) Prior Publication Data

US 2020/0312127 A1   Oct. 1, 2020

Related U.S. Application Data

(63) Continuation of application No. PCT/CN2017/107350, filed on Oct. 23, 2017.

(51) Int. Cl.
*G08G 1/01* (2006.01)
*G01C 21/34* (2006.01)
(Continued)

(52) U.S. Cl.
CPC ....... *G08G 1/0137* (2013.01); *G01C 21/3407* (2013.01); *G01C 21/3691* (2013.01);
(Continued)

(58) Field of Classification Search
CPC ...... G08G 1/0137; G08G 1/0116; G08G 1/04; G08G 1/052; G01C 21/3407; G01C 21/3691; G06K 9/00825
See application file for complete search history.

(56) References Cited

U.S. PATENT DOCUMENTS

2012/0116678 A1* 5/2012 Witmer ................... G06F 16/29
702/5
2016/0155334 A1* 6/2016 Jansson .................... G08G 1/07
340/906
(Continued)

FOREIGN PATENT DOCUMENTS

CN     104192148 A     12/2014
CN     105303853 A      2/2016
(Continued)

OTHER PUBLICATIONS

De Charette R., et al., "Real Time Visual Traffic Lights Recognition Based on Spot Light Detection and Adaptive Traffic Lights Templates", IEEE, 2009, pp. 358-363 (six (6) pages).
(Continued)

*Primary Examiner* — Peter D Nolan
*Assistant Examiner* — Wae L Louie
(74) *Attorney, Agent, or Firm* — Crowell & Moring LLP

(57) ABSTRACT

A method for determining driving strategy of a vehicle includes obtaining localization information of the vehicle, a driving route of the vehicle, and a current driving velocity of the vehicle. The method further includes detecting and interpreting a current status of a traffic light. The method further includes recognizing a duration of the current status of the traffic light. The method further includes detecting a relevant stop line. The method further includes obtaining a distance between the stop line and the vehicle. The method further includes determining whether to change the current driving velocity according to the current status of the traffic light, the duration of the current status of the traffic light, the distance between the traffic stop line and the vehicle, and the current driving velocity. A data processing device for determining driving strategy of a vehicle is also provided.

14 Claims, 4 Drawing Sheets

(51) Int. Cl.
  *G01C 21/36* (2006.01)
  *G08G 1/04* (2006.01)
  *G08G 1/052* (2006.01)
  *G06V 20/58* (2022.01)

(52) U.S. Cl.
  CPC ......... *G06V 20/584* (2022.01); *G08G 1/0116* (2013.01); *G08G 1/04* (2013.01); *G08G 1/052* (2013.01)

(56) References Cited

U.S. PATENT DOCUMENTS

| | | | |
|---|---|---|---|
| 2016/0225257 A1* | 8/2016 | Millan | G08G 1/096 |
| 2017/0259813 A1* | 9/2017 | Wokoeck | B60W 30/08 |
| 2017/0327030 A1* | 11/2017 | Kim | B60Q 1/24 |
| 2018/0122234 A1* | 5/2018 | Nascimento | G08G 1/0112 |
| 2018/0122237 A1* | 5/2018 | Nascimento | G08G 1/127 |
| 2019/0051179 A1* | 2/2019 | Alvarez | H04W 4/46 |
| 2019/0265727 A1* | 8/2019 | Suzuki | G05D 1/0088 |
| 2019/0360817 A1* | 11/2019 | Doemling | G01C 21/12 |
| 2019/0364219 A1* | 11/2019 | Doemling | H04N 5/23296 |
| 2019/0384522 A1* | 12/2019 | Yun | B60W 50/0098 |
| 2020/0031361 A1* | 1/2020 | Soliman | G05B 13/0265 |
| 2020/0094737 A1* | 3/2020 | Furukawa | B60W 50/14 |
| 2020/0312127 A1* | 10/2020 | Doemling | G08G 1/09623 |
| 2020/0326202 A1* | 10/2020 | Doemling | G06V 20/56 |
| 2020/0393269 A1* | 12/2020 | Doemling | G06T 19/006 |
| 2021/0356099 A1* | 11/2021 | Li | F21V 23/06 |

FOREIGN PATENT DOCUMENTS

| | | |
|---|---|---|
| CN | 106671975 A | 5/2017 |
| DE | 10 2014 204 059 A1 | 9/2015 |
| GB | 2486559 A | 6/2012 |

OTHER PUBLICATIONS

International Search Report (PCT/ISA/210) issued in PCT Application No. PCT/CN2017/107350 dated Jul. 24, 2018 with English translation (two (2) pages).

Written Opinion (PCT/ISA/237) issued in PCT Application No. PCT/CN2017/107350 dated Jul. 24, 2018 (four (4)pages).

* cited by examiner

METHOD AND APPARATUS FOR DETERMINING DRIVING STRATEGY OF A VEHICLE

CROSS REFERENCE TO RELATED APPLICATION

This application is a continuation of PCT International Application No. PCT/CN2017/107350, filed Oct. 23, 2017, the entire disclosure of which is herein expressly incorporated by reference.

BACKGROUND AND SUMMARY OF THE INVENTION

The present subject matter relates in general to the field of vehicle or robot, and to a method and an apparatus for determining a driving strategy of a vehicle.

The autonomous driving technology has been researched for many years, and many of the proposed benefits have been demonstrated in varied applications. A traffic light controls the use the roads by displaying lights of standard color. The green light means the passing period while the red light indicates the blocking period of the corresponding road/cross. Furthermore, in many countries, such as China and Canada, the traffic lights might have counting information to tell how much time the current light states will remain. For example, a display arranged next to the traffic lights shows countdown information indicating how many seconds the current state of the traffic light still lasts.

Traffic light detection is a part of the Driver Assistance System (DAS), which are applications installed in vehicles that provide guidance for safe driving. "Real time visual traffic lights recognition based on spot light detection and adaptive traffic lights templates", De Charette, Raoul, and Fawzi Nashashibi, Intelligent Vehicles Symposium, 2009 IEEE; IEEE, 2009, shows that highly automated driving (HAD) vehicles recognize traffic light state and behave properly, such as stop when the light is red and passing through when the light turns green.

However, said existing HAD vehicles neither adjust nor plan the driving speed (e.g. slowdown or acceleration) of the vehicle before the status of the traffic light changes, which may lead to emergency braking or inefficient driving behavior. Further, the sudden stopping of the vehicle not only affects driving comfort, but also can lead to a traffic accident.

The task of the present subject matter is to provide a method and an apparatus for determining driving strategy of a vehicle based on information shown by a traffic light, before the current state of the traffic light changes to the next state.

Embodiments of the present subject matter provide a method, a device, a system, and a vehicle for constructing an environment model, which enable determination of a driving strategy of a vehicle based on information shown by a traffic light before the current state of the traffic light changes to the next state.

Accordingly, a computer-implemented method for determining driving strategy of a vehicle is provided. The method for determining driving strategy of a vehicle, comprises
  obtaining localization information of the vehicle;
  obtaining a driving route of the vehicle;
  obtaining a current driving velocity (V) of the vehicle;
  detecting and interpreting a current status of a traffic light;
  recognizing a duration (t) of the current status of the traffic light;
  detecting a relevant stop line;
  obtaining a distance (D) between the stop line and the vehicle; and
  determining whether to change the current driving velocity according to the current status of the traffic light, the duration (t) of the current state of the traffic light, distance (D) between the traffic stop line and the vehicle and the current driving velocity (V).

The method according to the present subject matter detects traffic light state and counting information and uses such information to plan and change the longitudinal behavior (velocity) of the vehicle. Based on the traffic light countdown information, the vehicle can recognize when the state of the traffic light will change, and therefore, can adjust the driving speed according to the current state of the traffic light, the duration (t) of the current state of the traffic light, distance (D) between the traffic stop line and the vehicle and the current driving speed (V). Therefore, fuel-efficient braking/stopping and a safe and comfortable driving experience before intersections can be achieved. Moreover, due to the use of duration information of the traffic light traffic accident caused by a sudden stop of the vehicle can be avoided.

In a possible implementation manner, the step "detecting and interpreting a current status of a traffic light" comprises:
  finding the traffic light in a digital map, wherein the traffic light is relevant to the localization information and the driving route of the vehicle;
  obtaining a position of the traffic light from the digital map;
  obtaining an image of the traffic light according to the position of the traffic light by using an image sensor;
  recognizing the color of the traffic light; and
  determining whether the current status of the traffic light is a blocking period or a passing period based on the color of the traffic light.

The vehicle is equipped with a digital navigation map in which road information and traffic lights (and the controlling logic upon various driving lanes and routes) are stored in advance. The localization system can inform the accurate position of ego vehicle on that map. Based on such information, the method according to the present subject matter decides which traffic light is relevant to its driving route. Then the positions of traffic lights from the map and positions of traffic lights detected by using camera are projected into one same coordinate system (e.g. either global map frame, ego vehicle frame, or camera image frame), and the optimal match between traffic lights from the map and the real environment can be performed by comparing traffic lights from map to the detected image of the traffic lights. Once the optimal match is found, the relevant traffic light, which indicates the relevant traffic control information for the vehicle, in the real environment can be found by using the localization of the vehicle and the corresponding traffic light information in the map.

In another possible implementation manner, the step "recognizing a duration (t) of the current status of the traffic light" comprises:
  detecting a timer of the traffic light in the image of the traffic light; and
  obtaining the duration (t) of the current state of the traffic light by detecting and
  recognizing a countdown timer of the traffic light, wherein the countdown timer indicates the duration of the current status of the traffic light.

Said countdown timer is directed to indicate the duration (t) of the current state of the traffic light to the pedestrians and human drivers. According to the disclosed subject matter, the numeric count-down timing information is detected by a camera system, and the number is recognized through image recognition algorithm. Therefore, the vehicle can also utilize such information to plan the driving strategy by recognize the duration information of the current state showing by the traffic light. Furthermore, according to the disclosed subject matter, no additional devices or infrastructure changes are needed on the existing traffic lights.

In a further possible implementation manner, the step "detecting a relevant stop line" comprises:
obtaining a position of the relevant stop line from the digital map, wherein said relevant stop line is a stop line relevant to the traffic light and the driving route of the vehicle.

In a further possible implementation manner, the step "obtaining a distance (D) between the stop line and the vehicle" comprises:
calculating the distance (D) between the vehicle and the stop line based on the localization information of the vehicle and the position of the stop line.

In a further possible implementation manner, the step "determining whether to change the current driving velocity according to the current status of the traffic light, the duration (t) of the current state of the traffic light, distance (D) between the traffic stop line and the vehicle and the current driving velocity (V)" comprises:
in case that the current status of the traffic light is the blocking period, determining that the driving velocity has to be lowered, if V>D/t; and/or
in case that the current status of the traffic light is the passing period, determining that the driving velocity should be maintained higher than D/t, if V>D/t.

According to a further aspect, a data processing device for determining driving strategy of a vehicle is provided. The data processing device for determining driving strategy of a vehicle, comprising:
a localization information obtaining module configured to obtain localization information of the vehicle;
a route obtaining module configured to obtain a driving route of the vehicle.
a velocity obtaining module configured to obtain a current driving velocity (V) of the vehicle;
a traffic light detecting and interpreting module configured to detect a current status of a traffic light;
a duration recognition module configured to recognize a duration (t) of the current status of the traffic light;
a stop line detecting module configured to detect a relevant stop line;
a distance obtaining module configured to obtain a distance (D) between the stop line and the vehicle; and
a determining module configured to determine whether to change the current driving velocity according to the current status of the traffic light, the duration (t) of the current state of the traffic light, distance (D) between the traffic stop line and the vehicle and the current driving velocity (V).

In a possible implementation manner, the traffic light detecting and interpreting module (204) is further configured to:
find the traffic light in a digital map, wherein the traffic light is relevant to the localization information and the driving route of the vehicle;
obtain a position of the traffic light from the digital map;
obtain an image of the traffic light according to the position of the traffic light by using an image sensor;
recognize the color of the traffic light; and
determine whether the current status of the traffic light is a blocking period or a passing period based on the color of the traffic light.

In a further possible implementation manner, the duration recognition module is further configured to:
detect a timer of the traffic light in the image of the traffic light; and
obtain the duration (t) of the current state of the traffic light by detecting and recognizing a countdown timer of the traffic light, wherein the countdown timer indicates the duration of the current status of the traffic light.

In a further possible implementation manner, stop line detecting module is further configured to obtain a position of the relevant stop line from the digital map, wherein said relevant stop line is a stop line relevant to the traffic light and the driving route of the vehicle In a further possible implementation manner, the distance obtaining module is further configured to calculate the distance (D) between the vehicle and the stop line based on the localization information of the vehicle and the position of the stop line.

In a further possible implementation manner, the determining module is further configured to:
in case that the current status of the traffic light is the blocking period, determining that the driving velocity has to be lowered, if V>D/t; and/or
in case that the current status of the traffic light is the passing period, determining that the driving velocity should be maintained higher than D/t, if V>D/t.

According to a further aspect, a system for determining driving strategy of a vehicle is provided. The system comprises a data processing device mentioned above, at least one image sensor, a digital map and a localization module.

According to another further aspect, a vehicle comprising a system mentioned above is provided.

Based on the traffic light countdown information, the vehicle can get the information when the state of the traffic light will change to the next state and therefore can foreseeably adjust the driving speed according to the current state of the traffic light, the duration (t) of the current state of the traffic light, distance (D) between the traffic stop line and the vehicle and the current driving speed (V). Therefore, fuel-efficient braking/stopping and a safe and comfortable driving experience before intersections can be achieved. Moreover, due to the use of duration information of the traffic light traffic accident caused by a sudden stop of the vehicle can be avoided.

Moreover, the disclosed subject matter uses information for indicating the pedestrians and human drivers to plan the driving strategy, which does not need further infrastructure requirements, such as V2X communication equipment, for the existing traffic lights.

Other objects, advantages and novel features of the present invention will become apparent from the following detailed description of one or more preferred embodiments when considered in conjunction with the accompanying drawings.

BRIEF DESCRIPTION OF THE DRAWINGS

To describe the technical solutions in the embodiments of the present subject matter more clearly, the following briefly introduces the accompanying drawings required for describing the embodiments. Apparently, the accompanying drawings in the following description show merely some embodiments of the present subject matter, and a person of ordinary skill in the art may still derive other drawings from these accompanying drawings without creative efforts.

DETAILED DESCRIPTION OF THE DRAWINGS

The following clearly and completely describes the technical solutions in the embodiments of the present subject matter with reference to the accompanying drawings in the embodiments of the present subject matter. Apparently, the described embodiments are some but not all of the embodiments of the present subject matter. All other embodiments obtained by a person of ordinary skill in the art based on the embodiments of the present subject matter without creative efforts shall fall within the protection scope of the present subject matter.

Figure 1:
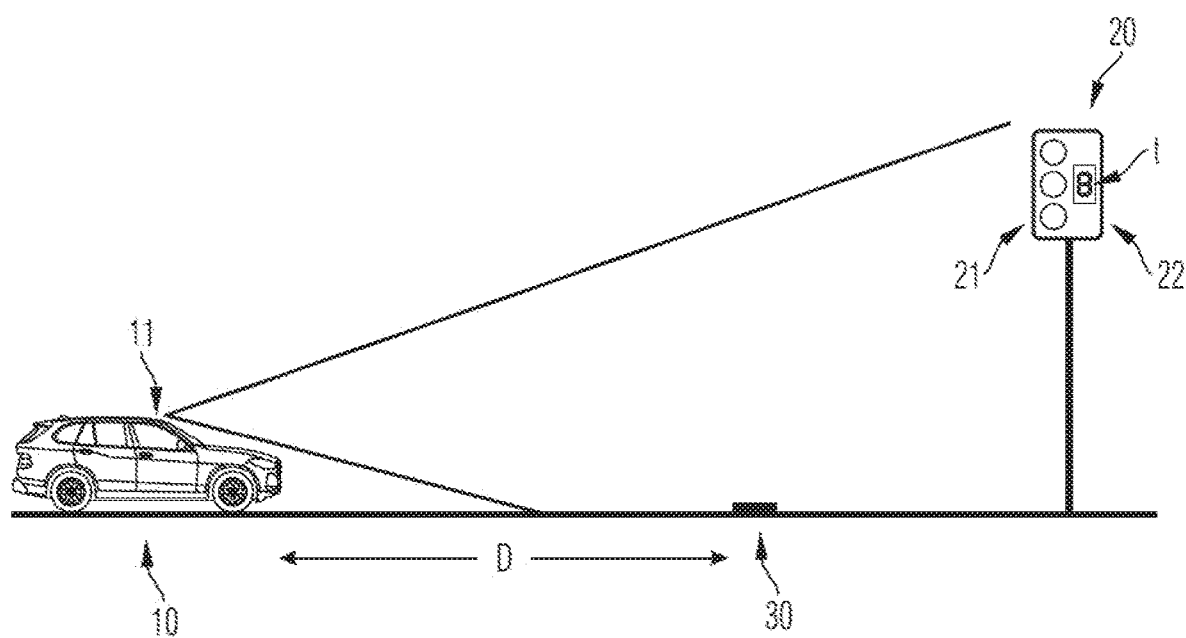
FIG. 1 shows a possible application scenario of the present subject matter.

FIG. 1 illustrates a car 10, a traffic light 20 and a stop line 30 corresponding to the traffic light 20 and the car 10. The image recording device 11, e.g. camera and video camera, is mounted on the car 10 and configured to sense and record the image data of the environment of the car 10.

The traffic light comprises a light part 21 that indicates the different traffic status by showing different colors as well as arrow shaped instruction. For example, the red color light indicates a blocking period and the green color light indicates a passing period. The traffic light further comprises a display 22 that indicates the duration(t) of the current state, especially the display can show a countdown indicating how many seconds the current status of the traffic light still last. As shown in FIG. 1, the car 10 is driving towards the traffic light 20 as well as the stop line 30 at a speed V.

The camera 11 on the car receives and records the image of the traffic light 20 and the stop line 30 and then provides the driving strategy determination module with the corresponding sensor data.

Figure 2:
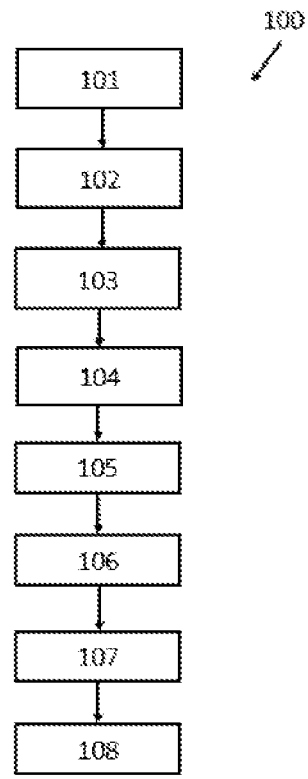
FIG. 2 is a schematic diagram of an embodiment of the method according to the present subject matter.
Figure 3:
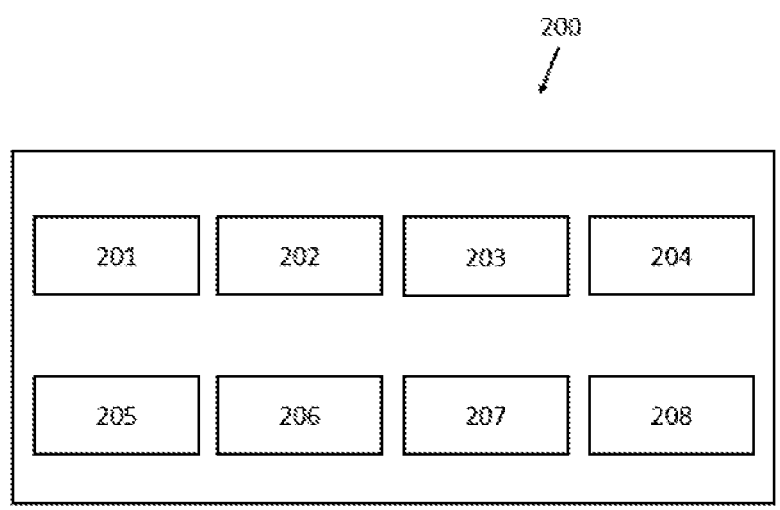
FIG. 3 is a schematic diagram of an embodiment of the data processing device according to the present subject matter.

FIG. 2 shows a block diagram of the method 100 for determining driving strategy of a vehicle according to the present subject matter.

In step 101, localization information of the vehicle is obtained from the on-board localization system, e.g. GPS or a self-localization module.

In step 102, navigation information comprising the driving route plan can be obtained from the on-board navigation module.

In step 103, the current driving velocity (V) of the vehicle is received from the speed sensor.

In steps 104 and 105, the task of receiving traffic control information form a traffic light with countdown timer is split into two parts of which, the first part deals with the detection of traffic lights. The changing traffic lights are detected by extracting the candidate region of traffic light and timer display by color segmentation using thresholding. The primary traffic light is detected by comparing the count of red pixels with the count of green pixels that is obtained as a result of thresholding. The second part recognizes the digits in the timer display (e.g. LED) by color segmentation, which is segmented and extracted by horizontal and vertical scanning. The extracted image is then resized to a standard size which is then converted into its binary form and bounding boxes of static width is placed over each segment of the extracted LED. The on/off status of each LED segment is obtained for all the segments and based on the different combination of each LED segment status, the digits can be recognized. Therefore the predominant traffic light and signal timings can be detected and recognized in a reasonable time.

According to step 104, a current status of a traffic light is detected and interpreted. Especially, the vehicle is equipped with a digital navigation map in which road information and traffic lights (and their controlling logic upon various driving lanes and routes) are stored in advance. The localization system can inform the accurate position of ego vehicle on that map. Based on such information, the method according to the present subject matter decides which traffic light is relevant to its driving route.

The data processing device for determining driving strategy of a vehicle finds the traffic light in the digital navigation map, wherein the traffic light is relevant to the localization information and the driving route of the vehicle, and then obtains a position of the traffic light from the digital map. The image of the traffic light can be taken according to the position of the traffic light by using an image sensor, e.g. camera or video camera. Then the traffic lights from the map and of traffic lights detected by using camera are projected into one same coordinate system (e.g. either global map frame, ego vehicle frame, or camera image frame), and the optimal match between traffic lights from the map and the real environment can be performed by comparing traffic lights from map to the image of the traffic lights. Once the optimal match is found, the relevant traffic light, which indicates the relevant traffic control information for the vehicle, in the real environment can be found by using the localization of the vehicle and the corresponding traffic light information in the map.

Further, the color of the traffic light will be recognized by using color segmentation of the image of the traffic light; and then the current status of the traffic light can be determined according to the color of the traffic light, wherein, normally, the red light indicates a blocking period of the road/cross while the green light means a passing period.

In step 105, a duration (t) of the current status of the traffic light is recognized, detecting a timer of the traffic light in the image of the traffic light. Especially, the duration (t) of the current state of the traffic light can be detected and recognized according to the image of the traffic light which comprises the image of the countdown timer of the traffic light. The digits in the timer display (e.g. LED) can be recognized by color segmentation, which is segmented and extracted by horizontal and vertical scanning. The extracted image is then resized to a standard size which is then converted into its binary form and bounding boxes of static width is placed over each segment of the extracted LED. The on/off status of each LED segment is obtained for all the segments and based on the different combination of each LED segment status, the digits can be recognized. Therefore the predominant traffic light and signal timings can be detected and recognized in a reasonable time.

Figure 4:
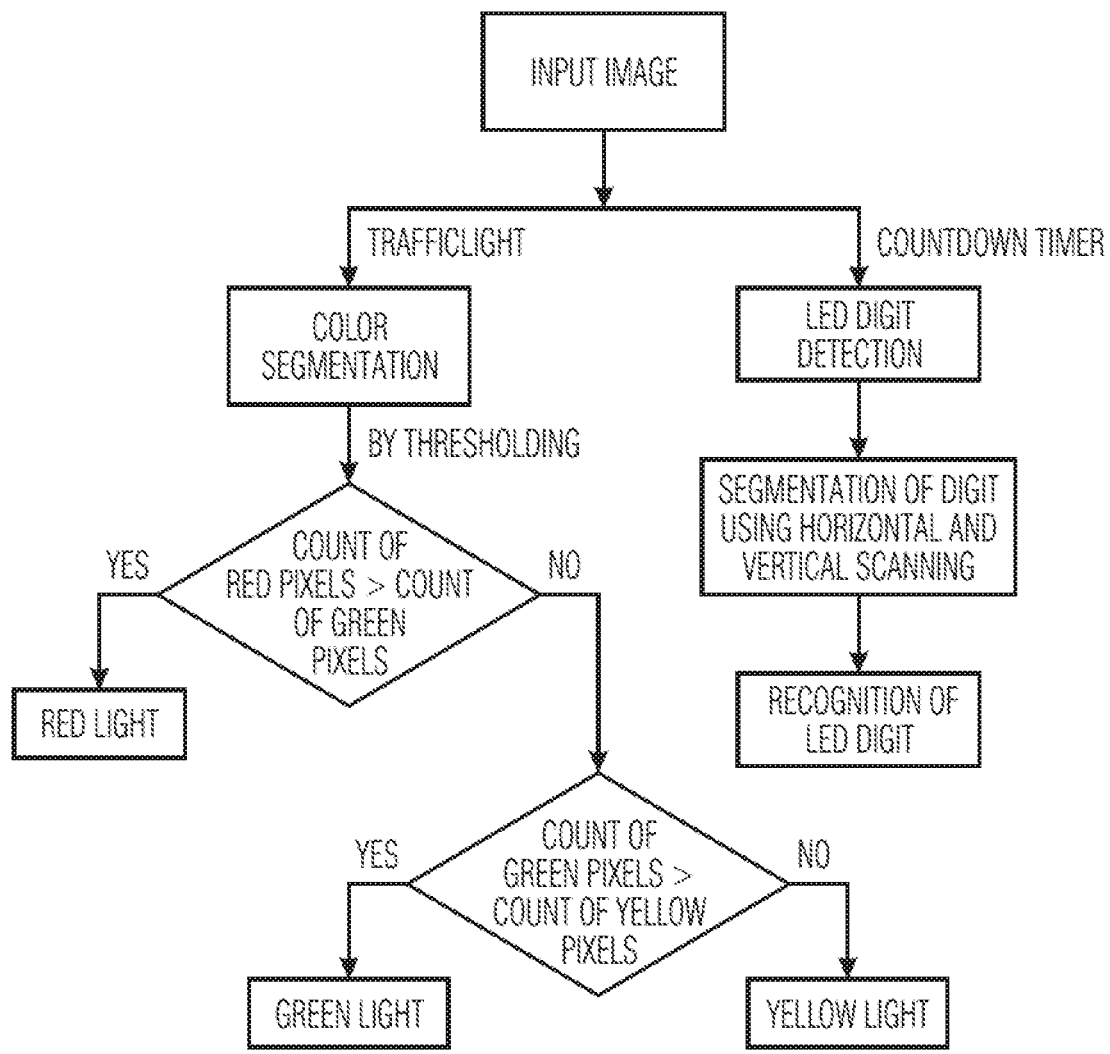
FIG. 4 is a block diagram of the traffic light detection and digit recognition process.

FIG. 4 shows a block diagram of the traffic light detection and digit recognition process. Traffic Light detection is done by color segmentation of the input image, based on the R, G, B color thresholding. The predominant glowing traffic light can be very well identified by this method regardless of the size and shape of the traffic lights. Some of the traffic lights also include LED display for count-down timers. These timers on traffic lights are useful for drivers and pedestrians to plan if there is enough time to attempt to cross the intersection before the light turns red and conversely, the amount of time before the light turns green. The digits in the display are segmented and identified.

Thresholding can provide an easy and convenient way to perform the segmentation on the basis of the different intensities or colors in the foreground and background regions of an image. In addition, it is useful to check which areas of the image consist of pixels whose values lie within a specified range, or band of intensities, or color. The important pixels are separated. Thus, the presence of red, yellow and green lights in the input image can be identified by setting the threshold.

Once the color segmentation is done, the total number of red pixels are compared with the total number of red pixels and then arrived at the conclusion based on the counts of pixels of the respective colors.

In order to extract the digit (timer values in the traffic signal) from the previously obtained image of the traffic light, horizontal and vertical segmented.

In step 106, a relevant stop line is detected by using image sensor, e.g. camera. Especially, a position of the relevant stop line can be obtained from the digital map, wherein said relevant stop line is a stop line relevant to the traffic light and the driving route of the vehicle.

The vehicle is equipped with the digital navigation map in which road information and traffic lights (and their controlling logic upon various driving lanes and routes) are stored in advance. The localization system can inform the accurate position of ego vehicle on that map. Based on such information, the method according to the present subject matter decides which stop line is relevant to its driving route and the detected traffic light. Then the positions of the stop line can be obtained from the map. Once the position/localization of said relevant stop line is obtained, according to step 107, a distance (D) between the stop line and the vehicle can be calculated according to the localization of the vehicle and the position/localization of said relevant stop line.

In step 108, it can be determined whether to change the current driving velocity, as well as to decide a new suitable driving speed, according to the current status of the traffic light, the duration (t) of the current state of the traffic light, distance (D) between the traffic stop line and the vehicle and the current driving velocity (V).

In case that the current status of the traffic light is the blocking period, the vehicle has to decide whether it will be influenced by the red traffic light according to the velocity and the duration of the blocking period. Especially, if V>D/t, the vehicle cannot pass the blocking area and has to stop before the stop line. Therefore, in this case, the driving velocity is too fast and should be lowered.

In case that the current status of the traffic light is the passing period, the vehicle has to determining whether the time shown by the countdown timer is enough for passing the traffic light. Especially, if V>D/t, the vehicle can pass the blocking area by driving at the speed (V) and need not stop before the stop line. Therefore, in this case, the driving velocity should be maintained higher than D/t, so that the vehicle can pass the stop line during the passing period of the traffic light.

FIG. 4 shows a schematic diagram of the data processing device 200 according to the present subject matter. The data processing device 200 can be implemented in a vehicle or a robot.

The data processing device 200 can implement the above-mentioned method for determining driving strategy of a vehicle. The data processing device 200 comprises a localization information obtaining module 201 configured to obtain localization information of the vehicle; a route obtaining module 202 configured to obtain a driving route of the vehicle; a velocity obtaining module 203 configured to obtain a current driving velocity V of the vehicle; a traffic light detecting and interpreting module 204 configured to detect a current status of a traffic light; a duration recognition module 205 configured to recognize a duration(t) of the current status of the traffic light; a stop line detecting module 206 configured to detect a relevant stop line; a distance obtaining module 207 configured to obtain a distance D between the stop line and the vehicle; and a determining module 208 configured to determine whether to change the current driving velocity according to the current status of the traffic light, the duration(t) of the current state of the traffic light, distance D between the traffic stop line and the vehicle and the current driving velocity V.

The traffic light detecting and interpreting module 204 is further configured to: find the traffic light in a digital map, wherein the traffic light is relevant to the localization information and the driving route of the vehicle; obtain a position of the traffic light from the digital map; obtain an image of the traffic light according to the position of the traffic light by using an image sensor; recognize the color of the traffic light; and determine whether the current status of the traffic light is a blocking period or a passing period based on the color of the traffic light.

The duration recognition module 205 is further configured to: detect a timer of the traffic light in the image of the traffic light; and obtain the duration(t) of the current state of the traffic light by detecting and recognizing a countdown timer of the traffic light, wherein the countdown timer indicates the duration of the current status of the traffic light.

Furthermore, the stop line detecting module 206 is configured to obtain a position of the relevant stop line from the digital map, wherein said relevant stop line is a stop line relevant to the traffic light and the driving route of the vehicle.

The distance obtaining module 207 is further configured to calculate the distance (D) between the vehicle and the stop line based on the localization information of the vehicle and the position of the stop line.

Moreover, the determining module 208 is further configured to: in case that the current status of the traffic light is the blocking period, determining that the driving velocity has to be lowered, if V>D/t; and/or in case that the current status of the traffic light is the passing period, determining that the driving velocity should be maintained higher than D/t, if V>D/t.

A system for performing the method of determining driving strategy of a vehicle comprises an above mentioned data processing device, at least one image sensor (e.g. camera, video camera and stereo camera), a digital map and a localization module.

Figure 5A:
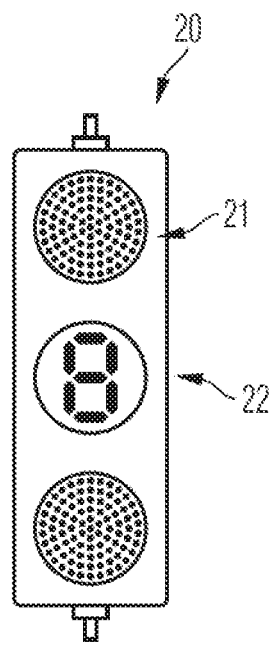
FIGS. 5a and 5b show examples of traffic lights with countdown timer.
Figure 5B:
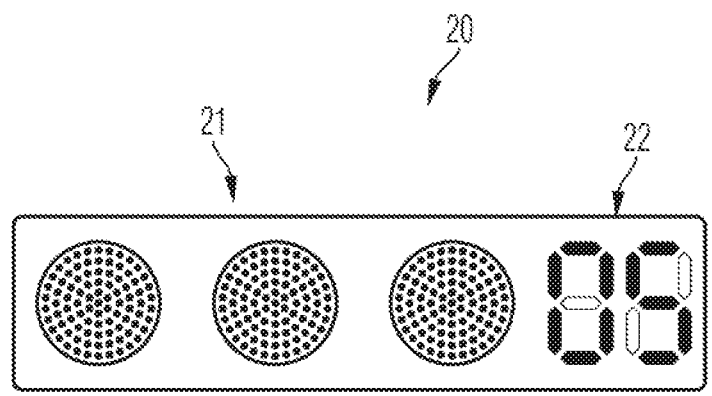

FIGS. 5a and 5b show examples of traffic lights 20 with countdown timer. The countdown timer 22 can be arranged below the traffic light 21 as shown in FIG. 5a, but also can be arranged next to the traffic light 21 as shown in FIG. 5b.

The foregoing disclosure has been set forth merely to illustrate the disclosed subject matter and is not intended to be limiting. Since modifications of the disclosed embodiments incorporating the spirit and substance of the subject matter may occur to persons skilled in the art, the disclosed subject matter should be construed to include everything within the scope of the appended claims and equivalents thereof.

What is claimed is:

1. A method for determining a driving strategy of a vehicle, comprising:
    obtaining localization information of the vehicle;
    obtaining a driving route of the vehicle;
    obtaining a current driving velocity of the vehicle;
    detecting and interpreting a current status of a traffic light;
    recognizing a duration of the current status of the traffic light;
    detecting a relevant stop line;
    obtaining a distance between the stop line and the vehicle; and
    determining whether to change the current driving velocity according to the current status of the traffic light, the duration of the current state of the traffic light, distance between a traffic stop line and the vehicle and the current driving velocity.

2. The method according to claim 1, wherein
    the step of detecting and interpreting a current status of a traffic light further comprises:
    finding the traffic light in a digital map, wherein
    the traffic light is relevant to the localization information and the driving route of the vehicle;
    obtaining a position of the traffic light from the digital map;
    obtaining an image of the traffic light according to the position of the traffic light by using an image sensor;
    recognizing a color of the traffic light; and
    determining whether the current status of the traffic light is a blocking period or a passing period based on the color of the traffic light.

3. The method according to claim 2, wherein
    the step of recognizing a duration of the current status of the traffic light further comprises:
    detecting a timer of the traffic light in the image of the traffic light; and
    obtaining the duration of the current state of the traffic light by detecting and recognizing a countdown timer of the traffic light, wherein
    the countdown timer indicates the duration of the current status of the traffic light.

4. The method according to claim 1, wherein
    the step of detecting a relevant stop line further comprises:
    obtaining a position of the relevant stop line from a digital map, wherein
    said relevant stop line is a stop line relevant to the traffic light and the driving route of the vehicle.

5. The method according to claim 4, wherein
    the step of obtaining a distance between the stop line and the vehicle further comprises:
    calculating the distance between the vehicle and the stop line based on the localization information of the vehicle and the position of the stop line.

6. The method according to claim 1, wherein
    the step of determining whether to change the current driving velocity according to the current status of the traffic light, the duration of the current state of the traffic light, distance between the traffic stop line and the vehicle and the current driving velocity further comprises:
    in case that the current status of the traffic light is a blocking period, determining that the driving velocity has to be lowered if $V>D/t$; and/or
    in case that the current status of the traffic light is a passing period, determining that the driving velocity should be maintained higher than $D/t$ if $V>D/t$.

7. A data processing device for determining driving strategy of a vehicle, comprising:
    a localization information obtaining module configured to obtain localization information of the vehicle;
    a route obtaining module configured to obtain a driving route of the vehicle;
    a velocity obtaining module configured to obtain a current driving velocity of the vehicle;
    a traffic light detecting and interpreting module configured to detect a current status of a traffic light;
    a duration recognition module configured to recognize a duration of the current status of the traffic light;
    a stop line detecting module configured to detect a relevant stop line;
    a distance obtaining module configured to obtain a distance between the stop line and the vehicle; and
    a determining module configured to determine whether to change the current driving velocity according to the current status of the traffic light, the duration of the current state of the traffic light, the distance between a traffic stop line and the vehicle, and the current driving velocity.

8. The data processing device according to claim 7, wherein
    the traffic light detecting and interpreting module is further configured to:
    find the traffic light in a digital map, wherein the traffic light is relevant to the localization information and the driving route of the vehicle;
    obtain a position of the traffic light from the digital map;
    obtain an image of the traffic light according to the position of the traffic light by using an image sensor;
    recognize a color of the traffic light; and
    determine whether the current status of the traffic light is a blocking period or a passing period based on the color of the traffic light.

9. The data processing device according to claim 8, wherein
    the duration recognition module is further configured to:
    detect a timer of the traffic light in the image of the traffic light; and
    obtain the duration of the current state of the traffic light by detecting and recognizing a countdown timer of the traffic light, wherein
    the countdown timer indicates the duration of the current status of the traffic light.

10. The data processing device according to claim 7, wherein
    the stop line detecting module is further configured to obtain a position of the relevant stop line from the digital map, wherein
    said relevant stop line is a stop line relevant to the traffic light and the driving route of the vehicle.

11. The data processing device according to claim 10, wherein
    the distance obtaining module is further configured to calculate the distance between the vehicle and the stop line based on the localization information of the vehicle and the position of the stop line.

12. The data processing device according to claim 7, wherein
    the determining module is further configured to:
    in case that the current status of the traffic light is the blocking period, determining that the driving velocity has to be lowered if $V>D/t$; and/or in case that the current status of the traffic light is the passing period, determining that the driving velocity should be maintained higher than D/t if V>D/t.

13. A system for determining driving strategy of a vehicle, comprising:
   a data processing device for determining driving strategy of a vehicle, comprising:
   a localization information obtaining module configured to obtain localization information of the vehicle;
   a route obtaining module configured to obtain a driving route of the vehicle;
   a velocity obtaining module configured to obtain a current driving velocity of the vehicle;
   a traffic light detecting and interpreting module configured to detect a current status of a traffic light;
   a duration recognition module configured to recognize a duration of the current status of the traffic light;
   a stop line detecting module configured to detect a relevant stop line;
   a distance obtaining module configured to obtain a distance between the stop line and the vehicle; and
   a determining module configured to determine whether to change the current driving velocity according to the current status of the traffic light, the duration of the current state of the traffic light, the distance between a traffic stop line and the vehicle, and the current driving velocity;
   an image sensor configured to obtain an image of the traffic light according to the position of the traffic light;
   a digital map configured to store a position of the traffic light; and
   a localization module configured to provide a localization of the vehicle.

14. A vehicle, comprising:
   a system for determining driving strategy of the vehicle, comprising:
   a data processing device for determining driving strategy of a vehicle, comprising:
   a localization information obtaining module configured to obtain localization information of the vehicle;
   a route obtaining module configured to obtain a driving route of the vehicle;
   a velocity obtaining module configured to obtain a current driving velocity of the vehicle;
   a traffic light detecting and interpreting module configured to detect a current status of a traffic light;
   a duration recognition module configured to recognize a duration of the current status of the traffic light;
   a stop line detecting module configured to detect a relevant stop line;
   a distance obtaining module configured to obtain a distance between the stop line and the vehicle; and
   a determining module configured to determine whether to change the current driving velocity according to the current status of the traffic light, the duration of the current state of the traffic light, the distance between a traffic stop line and the vehicle, and the current driving velocity;
   an image sensor configured to obtain an image of the traffic light according to the position of the traffic light;
   a digital map configured to store a position of the traffic light; and
   a localization module configured to provide a localization of the vehicle.

* * * * *